(12) United States Patent
Strigel et al.

(10) Patent No.: US 12,014,632 B2
(45) Date of Patent: Jun. 18, 2024

(54) METHOD FOR DETECTING BEACONS

(71) Applicant: Conti Temic microelectronic GmbH, Nuremberg (DE)

(72) Inventors: Elias Strigel, Wangen (DE); Martin Pfitzer, Lindau (DE); Stefan Heinrich, Achern (DE); Dieter Kroekel, Eriskirch (DE)

(73) Assignee: CONTI TEMIC MICROELECTRONIC GMBH (DE)

( * ) Notice: Subject to any disclaimer, the term of this patent is extended or adjusted under 35 U.S.C. 154(b) by 499 days.

(21) Appl. No.: 17/052,267

(22) PCT Filed: May 8, 2019

(86) PCT No.: PCT/DE2019/200039
§ 371 (c)(1),
(2) Date: Nov. 2, 2020

(87) PCT Pub. No.: WO2019/238177
PCT Pub. Date: Dec. 19, 2019

(65) Prior Publication Data
US 2021/0089797 A1 Mar. 25, 2021

(30) Foreign Application Priority Data
Jun. 12, 2018 (DE) .................... 10 2018 209 306.7

(51) Int. Cl.
*G06T 7/11* (2017.01)
*G06F 18/24* (2023.01)
(Continued)

(52) U.S. Cl.
CPC ........... *G08G 1/0965* (2013.01); *G06F 18/24* (2023.01); *G06N 3/02* (2013.01); *G06V 20/584* (2022.01)

(58) Field of Classification Search
CPC ...... G06V 20/584; G06V 20/52; G06V 10/56; G06V 20/00; G06V 20/58; G06V 10/431;
(Continued)

(56) References Cited

U.S. PATENT DOCUMENTS 6,734,787 B2    5/2004  Ikeda
8,178,240 B2 *  5/2012  Wang .................. H01M 4/0421
                                                           429/231.1
(Continued)

FOREIGN PATENT DOCUMENTS

CN    103514664 A    1/2014
CN    104361753 A    2/2015
(Continued)

OTHER PUBLICATIONS

European Examination Report for European Application No. 19 727 283.4, dated Jan. 19, 2023 with translation, 8 pages.
(Continued)

*Primary Examiner* — Quan M Hua
(74) *Attorney, Agent, or Firm* — Buchanan Ingersoll & Rooney PC

(57) ABSTRACT

The invention relates to a method for detecting beacons (4) in the surroundings of an ego vehicle (5), comprising the steps of:
capturing (S1) a sequence of camera images (1) of a section of the surroundings by means of a-camera system (6) of the ego vehicle (5),
detecting (S2) bright light spots in the recorded camera image (1),
cutting out (S3) regions (3) containing the detected bright light spots in the camera image (1),
classifying (S4) the cut-out regions (3),
(Continued)

classing (S5) the bright light spots as beacons (4) if the classified bright light spots are detected repeatedly and therefore a threshold value of a counter is exceeded.

9 Claims, 2 Drawing Sheets

(51) Int. Cl.
 *G06N 3/02* (2006.01)
 *G06V 20/58* (2022.01)
 *G08G 1/0965* (2006.01)

(58) Field of Classification Search
 CPC ........ G06V 10/25; G06V 20/56; G06V 10/40; G06V 10/764; G06V 20/59; G06V 20/625; G06V 40/172; G06K 19/06009; G06K 7/12; G06T 7/90; G06T 2207/30252; G06T 2207/20056; G06T 5/10; G06T 2207/10024; G06T 2207/20081; G06T 2207/20084; G06T 2207/10016; H04N 21/21805; H04N 23/683; H04N 21/2181; H04N 7/181; H04W 88/06
 See application file for complete search history.

(56) References Cited

U.S. PATENT DOCUMENTS

| | | | | |
|---|---|---|---|---|
| 8,908,921 | B2 * | 12/2014 | Ishikawa | G06V 10/771 382/168 |
| 2009/0103779 | A1 | 4/2009 | Loehlein et al. | |
| 2011/0310249 | A1 | 12/2011 | Lambert et al. | |
| 2014/0078291 | A1 | 3/2014 | Hammarström et al. | |
| 2014/0340425 | A1 | 11/2014 | Tsukikawa | |
| 2015/0016679 | A1 * | 1/2015 | Cao | G06V 10/50 382/103 |
| 2015/0310606 | A1 | 10/2015 | Shreve et al. | |
| 2017/0083788 | A1 | 3/2017 | Chan et al. | |
| 2017/0200067 | A1 * | 7/2017 | Zhou | G06V 30/194 |
| 2018/0114078 | A1 | 4/2018 | Tokita | |
| 2019/0293758 | A1 * | 9/2019 | Masui | G08G 1/16 |

FOREIGN PATENT DOCUMENTS

| | | | |
|---|---|---|---|
| DE | 102007013664 | | 9/2007 |
| DE | 102009051100 A1 | | 5/2010 |
| DE | 102010024415 | | 12/2011 |
| EP | 2 523 173 | | 11/2012 |
| EP | 2523173 A1 | * | 11/2012 ......... G06K 9/00825 |
| JP | 05266190 A | | 10/1993 |
| JP | 2002319091 A | | 10/2002 |
| JP | 2004013592 A | * | 1/2004 |
| JP | 2009241636 A | | 10/2009 |
| JP | 2017041132 A | | 2/2017 |
| JP | 2017130163 A | | 7/2017 |
| JP | 2017-182696 A | | 10/2017 |
| JP | 2018206035 A | * | 12/2018 |
| KR | 101288754 B1 | * | 3/2012 |

OTHER PUBLICATIONS

English translation of the International Search Report of the International Searching Authority for International Application PCT/DE2019/200039, dated Sep. 12, 2019, 2 pages, European Patent Office, HV Rijswijk, Netherlands.
PCT International Preliminary Report on Patentability including English Translation of PCT Written Opinion of the International Searching Authority for International Application PCT/DE2019/200039, dated Dec. 15, 2020, 11 pages, International Bureau of WIPO, Geneva, Switzerland.
German Search Report for German Patent Application No. 10 2018 209 306.7, dated Jan. 31, 2019, 8 pages, German Patent and Trademark Office, Muenchen, Germany, with English partial translation, 6 pages.
Kato et al., "A Fundamental Study of a Risk Prediction System Based on Standing Vehicle Detection in a Vicinity of a Bus Stop", IEICE Technical Report, Japan, general incorporated foundation Institute of Electronics, Information and Communication Engineers, Aug. 17, 2015, vol. 115(187), 6 pages, ISSN 0913-5685 (abstract only).
Japanese Notice of Reasons for Refusal for Japanese Application No. 2020-558428, dated Jan. 18, 2023 with translation, 7 pages.
Japanese Notice of Reasons for Refusal for Japanese Application No. 2020-558428, dated May 30, 2023 with translation, 9 pages.
Chinese Office Action for Chinese Application No. 201980033579.2, dated Dec. 8, 2023 with translation, 11 pages.
Office Action (Decision to Grant a Patent) dated Jan. 24, 2024, by the Japan Patent Office in corresponding Japanese Patent Application No. 2020-558428 and an English translation of the Office Action. (4 pages).

* cited by examiner

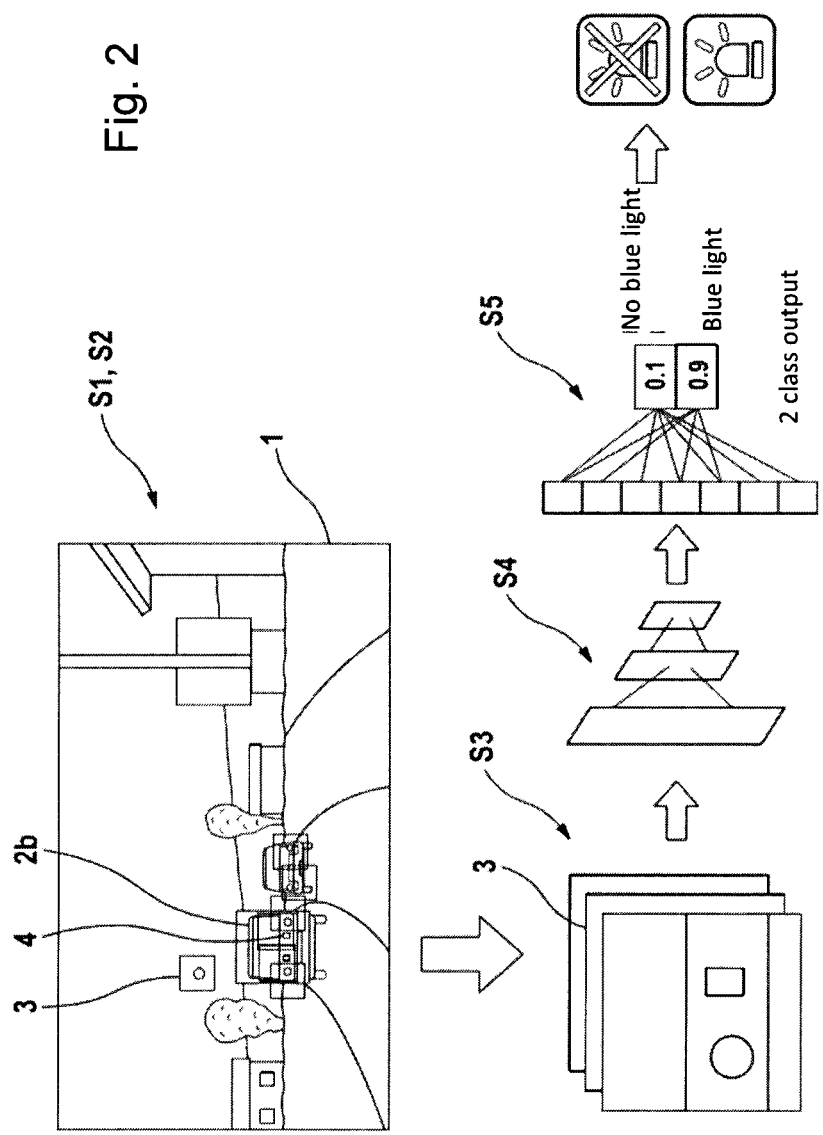

METHOD FOR DETECTING BEACONS

The invention relates to a method for detecting beacons.

Methods are known from the prior art by means of which traffic lights can be recognized, for example, with it also being possible to determine which color the traffic lights are showing in the process. It is also known to recognize other road users on the basis of their front and/or rear lights.

The drawback of the known methods is that they only determine whether a vehicle is present, for example, but cannot give any further information on the vehicle. Therefore, inter alia, service vehicles, for example a police car, cannot be recognized; however, a service vehicle of this kind requires particular driver behavior under certain conditions.

The object of the present invention is therefore to provide a method by means of which the recognition of service vehicles can be reliably ensured.

This object is achieved by the subject matter of claim 1. Other embodiments are found in the dependent claims.

Initial considerations were that service vehicles could be recognized most reliably by way of active beacons. For example, the blue light, inter alia, is characteristic of the police, fire department, and ambulances. When an active beacon is recognized, the presence of a service vehicle can be directly concluded.

According to the invention, a method for detecting beacons in the surroundings of an ego vehicle is accordingly proposed, comprising the steps of:
- capturing a sequence of camera images of a section of the surroundings by means of a camera system of the ego vehicle,
- detecting bright light spots in the recorded camera image,
- cutting out regions containing the detected bright light spots in the camera image,
- classifying the cut-out regions,
- classing the classified bright light spots as beacons if the classified bright light spots are detected multiple times successively and therefore a threshold value of a counter is exceeded.

Here, the term "beacon" describes so-called rotating beacons, as are used by the police in Germany, but also front beacons, as are used e.g. for service motorcycles or also for ambulances on the radiator grill.

The camera system may be a mono camera, a stereo camera, or a surround-view camera system.

"Bright light spots" are understood to be the 10 to 50 brightest regions in a particular color channel, for example. If the vicinity of a pixel is just as bright, this is considered to be one region and is only fed to the classifier once, and therefore only counts once in the 10 to 50 brightest regions. This prevents all the bright regions from being attributed to one lamp.

The threshold value of a counter, as used here, is a certain number of detections of classified light spots which there has to be before it can be concluded that a beacon is present. It is important here that only the accordingly classified light spots are taken into consideration, since only one or more specific colors are relevant here. This prevents a turn signal from being mistakenly identified as a beacon, for example.

In a particularly preferred embodiment, a neural network is used for the classification.

Particularly preferably, the neural network forms a classifier for light, in particular colored light. Particularly preferably, the colored light is blue light. In this embodiment, the brightest regions or maxima are specially viewed in a particular channel, in the blue channel for blue light. For other colors, such as red, the maxima would then be viewed in the red channel. One classifier can be used for each color. The different classifiers can then also be used in parallel in order for it to be possible to reliably recognize a combined beacon made up of blue and red, as used in the USA amongst other places, for example. It would also be conceivable to train a classifier with a plurality of classes, such that an individual classifier can be used for different colors.

Preferably, the at least one classifier comprises an output by means of which a color of the light is output. This is advantageous in particular when using a plurality of classifiers for different colors.

Preferably, in a further step, the information regarding a beacon is provided to a driver and/or to a driver assistance system. The information can be provided to a driver optically via a head-up display or via a display in or on the dashboard, for example. Alternatively or additionally, an acoustic indication can also be provided. Providing the information to a driver is advantageous to this effect since said driver can perform a corresponding driving maneuver on the basis of the information if necessary and/or they pay more attention to potentially anomalous driving behavior of the other road users. Furthermore, providing said information to a driver assistance system is advantageous since, in this way, the ego vehicle can autonomously take action to clear a path for the service vehicle, for example.

In a preferred embodiment, a counter is incremented after each detection of the classified light spots and is decremented if a detection is absent. The counter is accordingly incremented until there is a certain number of positive detections. "Positive detections" are referred to as detections which have been classified as emergency lights of a service vehicle. If, however, emergency lights of a service vehicle are detected just once, although the counter is initially increased, this counter does not then exceed the threshold value, and is decremented again. The starting value is 1, for example, which is thus exceeded from the first detection and is thus also incremented. A maximum value may be 3, for example. Therefore, the counter would be incremented twice from 1 to 3, and the fourth detection would then be decisive for classing the detections as a beacon. A method configured in this way is particularly advantageous since the output of false positives can be eliminated in this way.

Other advantageous embodiments are found in the drawings.

In the drawings:

FIG. 2 is a schematic sequence of a preferred embodiment of the method.

Figure 1:
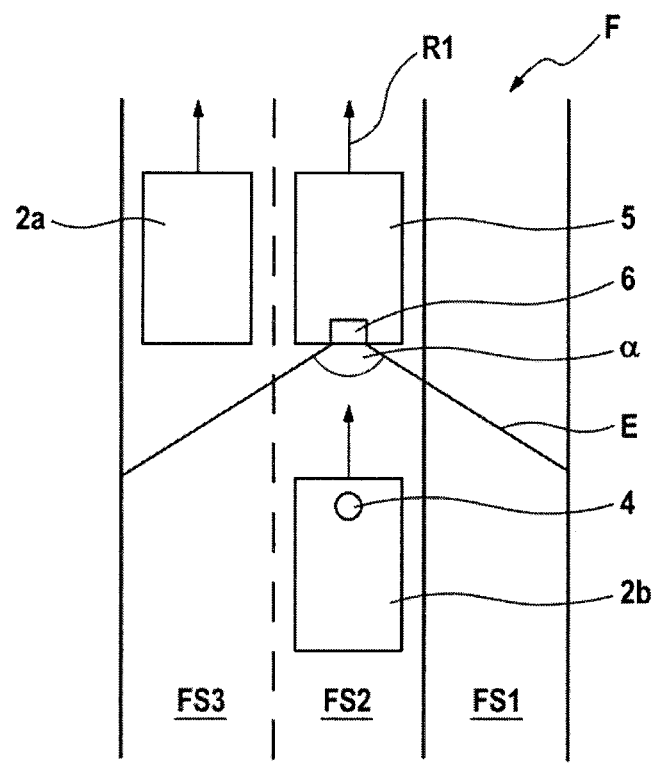
FIG. 1 is a schematic view of an exemplary traffic situation.

FIG. 1 is a schematic view of an exemplary traffic situation. In this traffic situation, an ego vehicle 5 is in the lane FS2 and another vehicle 2a is in the lane FS3, beside the ego vehicle 5, and another vehicle 2b is in the lane FS2 behind the ego vehicle 5 on a road F. The three vehicles are moving in the same movement direction R1 in this case. The road additionally has a shoulder FS1. The ego vehicle comprises a camera 6 having a detection range E and an opening angle α, which is directed backwards as part of a surround-view camera system, for example. The other vehicle 2b comprises a beacon 4, which is configured as a rotating beacon, for example. The other vehicle 2b is detected by means of the camera 6 of the ego vehicle 5 and bright light spots are detected in the thus recorded image in order to identify the presence of the beacon 4. If an active beacon 4 of the other vehicle 2b is identified, the ego vehicle can move onto the shoulder FS1, for example, in order to clear a path for the other vehicle 2b, which has been categorized as a service vehicle.

FIG. 2 is a schematic sequence of a preferred embodiment of the method. In step S1, a sequence of camera images 1 of a section of the surroundings is recorded by means of a camera system 6 of the ego vehicle 5. In step S2, bright light spots or regions 3 are detected in the recorded camera image 1. In a subsequent step S3, the regions containing bright light spots in the camera image 1 are cut out. These cut-out regions 3 are then classified in step S4. In step S5, the bright light spots are classed as beacons 4 if the classified bright light spots are detected multiple times successively and therefore a threshold value is exceeded. The beacons 4 are positioned on the front of the vehicle 2b in the recorded camera image shown here.

LIST OF REFERENCE SIGNS

1 Camera image
2a, 2b Other vehicle
3 Region
4 Beacon
5 Ego vehicle
6 Camera system
E Detection range
F Road
FS1-FS3 Lane
R1 Movement direction of ego vehicle
S1-S5 Method steps

The invention claimed is:

1. A method for detecting beacons in the surroundings of an ego vehicle, the method comprising:
capturing a sequence of camera images of a section of the surroundings by a camera system of the ego vehicle,
detecting bright light spots in at least one camera image of the sequence of captured camera images, wherein the bright light spots are ten to fifty brightest regions in a particular color channel,
cutting out regions containing the detected bright light spots in the camera image,
classifying the cut-out regions, classifying the bright light spots as beacons if the classified bright light spots are detected repeatedly and therefore a threshold value of a counter is exceeded, and incrementing the counter until a predetermined number of positive detections of the classified bright light spots is achieved, wherein the counter is incremented after each detection of the classified light spots and is decremented if a detection of the classified light spots is not achieved.

2. The method according to claim 1, wherein a neural network is used for the classification of the bright light spots.

3. The method according to claim 2, wherein the neural network forms at least one classifier for a colored light.

4. The method according to claim 3, wherein the at least one classifier comprises an output by which a color of the colored light is output.

5. The method according to claim 1, wherein, in a further step, information regarding at least one beacon of the beacons is provided to a driver and/or to a driver assistance system.

6. The method according to claim 2, wherein the neural network uses one classifier for each color of a plurality of colors.

7. The method according to claim 2, wherein the neural network uses different classifiers in parallel for recognizing a combined beacon made up of multiple colors.

8. The method according to claim 2, wherein the neural network trains an individual classifier with a plurality of classes, and wherein the individual classifier is used for different colors.

9. The method according to claim 3, wherein if a vicinity of a pixel in the camera images is as bright as the ten to fifty brightest regions in the particular color channel, the vicinity of the pixel is considered to be one region and is only fed to the classifier once.

* * * * *